(12) United States Patent
Clark et al.

(10) Patent No.: US 11,042,360 B1
(45) Date of Patent: *Jun. 22, 2021

(54) MULTIPLIER CIRCUITRY FOR MULTIPLYING OPERANDS OF MULTIPLE DATA TYPES

(71) Applicant: Groq, Inc., Mountain View, CA (US)

(72) Inventors: Christopher Aaron Clark, Madison, WI (US); Jonathan Ross, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,007

(22) Filed: Aug. 5, 2020

Related U.S. Application Data

(63) Continuation of application No. 16/139,093, filed on Sep. 23, 2018, now Pat. No. 10,776,078.

(51) Int. Cl.
*G06F 7/487* (2006.01)
*G06F 7/544* (2006.01)
*G06F 5/01* (2006.01)

(52) U.S. Cl.
CPC ............ *G06F 7/5443* (2013.01); *G06F 5/012* (2013.01); *G06F 7/4876* (2013.01)

(58) Field of Classification Search
CPC ....... G06F 7/5443; G06F 5/012; G06F 7/4876
USPC ................................................. 708/620, 625
See application file for complete search history.

(56) References Cited

U.S. PATENT DOCUMENTS

| 5,586,070 | A | 12/1996 | Purcell |
| 5,880,985 | A | 3/1999 | Makineni et al. |
| 8,001,360 | B2 | 8/2011 | Hansen et al. |
| 8,195,735 | B2 | 6/2012 | Hansen et al. |

OTHER PUBLICATIONS

"Nvidia Tesla V100 GPU Architecture", The World's Most Advanced Data Center GPU, nVIDIA, Aug. 2017, 58 pages.
United States Office Action, U.S. Appl. No. 16/139,093, dated Mar. 6, 2020, eight pages.

*Primary Examiner* — Tan V Mai
(74) *Attorney, Agent, or Firm* — Fenwick & West LLP

(57) ABSTRACT

In one embodiment, in a first mode, first and second input operands having a first data type are multiplied using one or more of a plurality of multipliers, and in second mode, a plurality of input operands having a second data type are multiplied using the plurality of multipliers. Accordingly, multiplier circuitry may process different input data types and share circuitry across the different modes. In some embodiments, in the first mode, products may be converted to a third data type, and in the second mode, multiple products may be concatenated. Values in the third data type, in the first mode, and concatenated values having the second data type, in the second mode, may be added across different multimodal multipliers to form a multiply-accumulator. In some embodiments, the plurality of multiply-accumulators may be configured in series.

20 Claims, 7 Drawing Sheets

US 11,042,360 B1

MULTIPLIER CIRCUITRY FOR MULTIPLYING OPERANDS OF MULTIPLE DATA TYPES

CROSS REFERENCE TO RELATED APPLICATIONS

This application is a continuation of co-pending U.S. application Ser. No. 16/139,093, filed Sep. 23, 2018, which is herein incorporated in its entirety by reference.

BACKGROUND

The present disclosure relates to digital circuits, and in particular, to digital multimodal multiplier systems and methods.

Digital circuits process logical signals represented by zeros (0) and ones (1) (i.e., bits). A digital multiply-accumulator is an electronic circuit capable of receiving multiple digital input values, determining a product of the input values, and summing the results. Performing digital multiply-accumulate operations can raise a number of challenges. For example, data values being multiplied may be represented digitally in a number of different data types. However, including different multipliers to handle all the different data types a system may need to process would consume circuit area and increase complexity.

One particular application where digital multiplication of different data types is particularly useful is machine learning (aka artificial intelligence). Such applications may receive large volumes of data values in a multiply-accumulator. Accordingly, such systems require particularly fast, efficient, and/or accurate multiply-accumulators capable of handling multiple different data types to carry out various system functions.

SUMMARY

Embodiments of the present disclosure pertain to digital multimodal multiplier systems and methods. In one embodiment, the present disclosure includes a circuit comprising a plurality of multimodal multiplier circuits, the multimodal multiplier circuits comprising one or more storage register circuits for storing digital bits corresponding to one or more first operands and one or more second operands. In a first mode, the one or more storage register circuits store one first operand and one second operand having a first data type. In a second mode, the one or more storage register circuits store a first plurality of operands and a second plurality of operands having a second data type. A plurality of multiplier circuits are configured to receive the one or more first operands and the one or more second operands. In the first mode, the one first operand and the one second operand are multiplied in one or more of the plurality of multiplier circuits. In the second mode, a first operand of the first plurality of operands is multiplied with a first operand of the second plurality of operands and a second operand of the first plurality of operands is multiplied with a second operand of the second plurality of operands in the plurality of multiplier circuits.

In one embodiment, the first operands are weights and the second operands are activation values.

In one embodiment, the one first operand and the one second operand having the first data type comprise floating point values, and the first and second plurality of operands having the second data type comprise integer values.

In one embodiment, at least one of the plurality of multiplier circuits are used to multiply operands in both the first mode and the second mode. In another embodiment, a number of multiplier circuits used to multiply operands in the first mode is the same as a number of multiplier circuits used to multiply operands in the second mode.

In one embodiment, the one first operand and the one second operand having the first data type comprise a greater number of bits than the first and second plurality of operands having the second data type.

In another embodiment, the techniques described herein are incorporated in a hardware description language program, the hardware description language program comprising sets of instructions, which when executed produce a digital circuit. The hardware description language program may be stored on a non-transitory machine-readable medium, such as a computer memory (e.g., a data storage system).

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include equivalent modifications of the features and techniques described herein.

Figure 1:
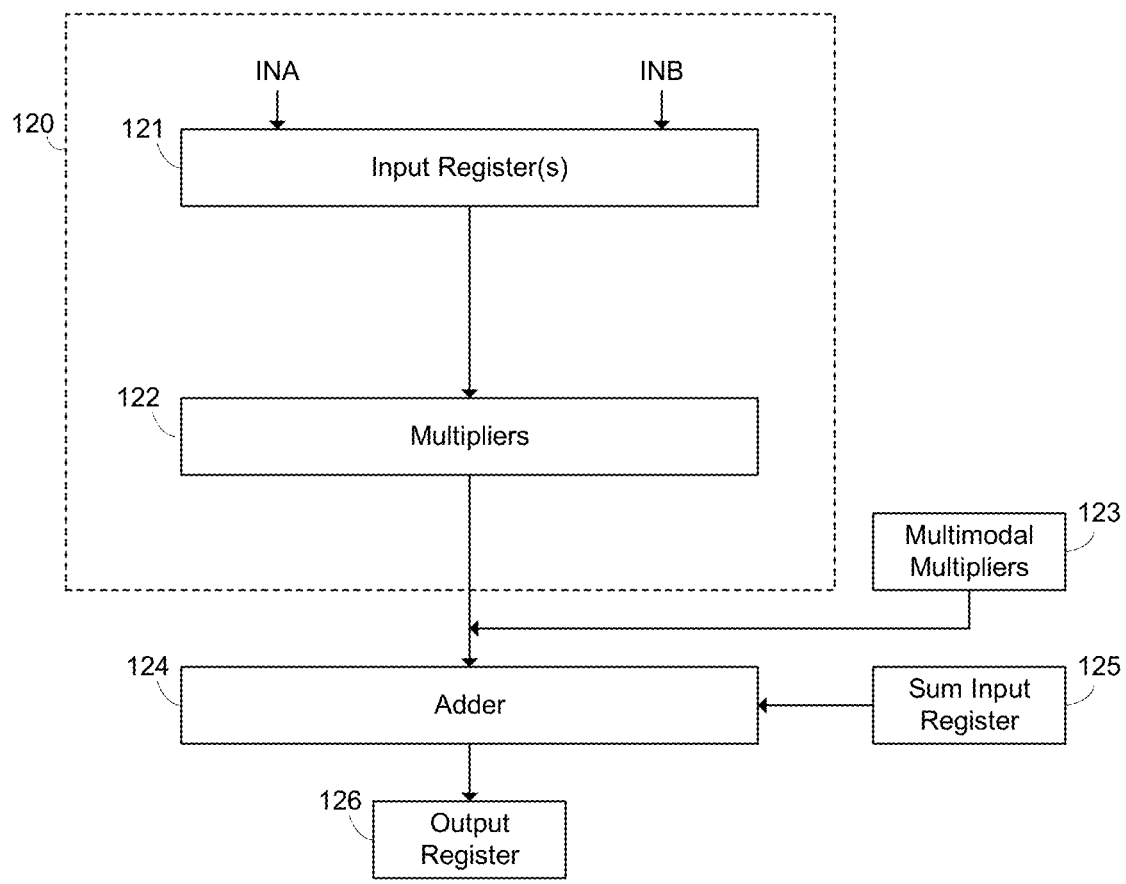
FIG. 1 illustrates a multimodal multiplier circuit according to one embodiment.

FIG. 1 illustrates a multimodal multiplier circuit according to one embodiment. Features and advantages of the present disclosure include multimodal multiplier circuits that may receive and process different data types with different numbers of bits in different modes and share circuitry, which may advantageously reduce circuit area and may improve the speed and efficiency of processing data, for example. For instance, a multimodal multiplier circuit 120 may include one or more input storage register circuits 121 for storing digital bits representing input operands to be multiplied. The storage register circuits 121 may store different numbers of operands to be multiplied together in different modes, and the operands may have different data types and different numbers of bits. Storage register circuits are circuits that store digital bits, such as a plurality of flip flops or other digital storage circuits known to those skilled in the art. A single storage register circuit may be partitioned into multiple storage register circuits, for example, to store different digital values (e.g., operands). In one embodiment, in a first mode, the one or more storage register circuits 121 store one first operand and one second operand having a first data type, and in a second mode the one or more storage register circuits store a first plurality of operands and a second plurality of operands having a second data type. A plurality of multiplier circuits 122 may be configured to receive the one or more first operands and the one or more second operands, for example. As illustrated in various embodiments disclosed herein, multipliers may be shared across modes. For example, in a first mode, two operands having the first data type are multiplied in one or more of the plurality of multiplier circuits 122. In a second mode, a first plurality of operands and a second plurality of operands are multiplied in the plurality of multiplier circuits 122. The first and second plurality of operands multiplied in the second mode may have fewer bits than the first and second operands multiplied in the first mode, for example. However, one or more of the multiplier circuits may be used for both modes. For example, in one embodiment, at least one of the plurality of multiplier circuits is used to multiply operands in both the first mode and the second mode. In another embodiment, a number of multiplier circuits used to multiply operands in the first mode is the same as the number of multiplier circuits used to multiply operands in the second mode.

As further illustrated in FIG. 1, in some embodiments, multimodal multiplier circuits 120 may be combined to form multimodal multiply-accumulator circuits. For example, an output of multimodal circuit 120 may comprise output product values having different data types or even different numbers of output products in different modes, for example. Output products of a plurality of other multimodal multipliers 123 may be summed with output products of multimodal multiplier 120 in adder 124 to produce a multimodal multiply-accumulator. Additionally, in other embodiments disclosed herein, an input register 125 may receive an input value (e.g., an output of another multiply-accumulator) and adder 124 may sum locally generated products with sums generated by other multimodal multiply accumulators, for example. An output register may store a summed result and may couple the result to additional multiply-accumulator circuits, for example. Arrays of such multimodal multiply-accumulate circuits may be configured to process large volumes of operands having different data types, for example. Embodiments of the disclosure may be particularly advantageous in machine learning (aka artificial intelligence) digital processing circuit applications, where the one or more first operands are weights and the one or more second operands are activation values, for example.

Figure 1A:
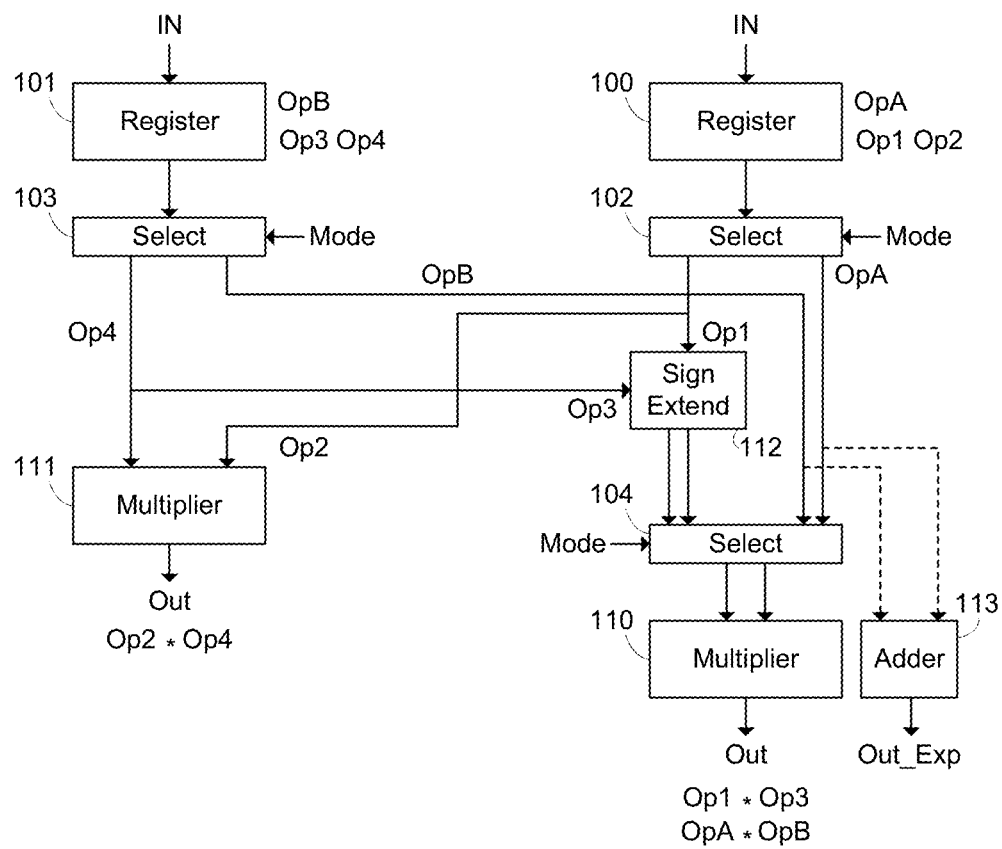
FIG. 1A illustrates a multimodal multiplier circuit according to another embodiment.

FIG. 1A illustrates a multimodal multiplier circuit according to another embodiment. In this example, storage register circuit 100 may store digital bits corresponding to one or more first operands. Similarly, a second storage register circuit 101 may store digital bits corresponding to one or more second operands. As mentioned above, registers 100 and 101 may be one partitioned register or multiple distinct registers, for example. In a first mode, the first and second storage register circuits 100 and 101 each may store one first operand and one second operand having a first data type (e.g., OpA and OpB, respectively), and in a second mode the first storage register circuit 100 stores a first plurality of operands (e.g., Op1 and Op2) and the second storage register circuit 101 stores a second plurality of operands (e.g., Op3 and Op4) having a second data type. In one embodiment, operands having the first data type may comprise a greater number of bits than operands having the second data type, for example. In one embodiment, operands having the first data type comprise floating point values, for example, and operands having the second data type comprise integer values, for example.

Referring again to FIG. 1, first and second multiplier circuits 110 and 111 are coupled to the first and second storage register circuits 100 and 101. In a first mode, one first operand (e.g., OpA) in the first storage register circuit 100 and one second operand (e.g., OpB) in the second storage register circuit 101 are coupled to the first multiplier circuit 110. In a second mode, a first operand of the first plurality of operands (e.g., Op1 of Op1 and Op2) in the first storage register circuit 100 and a first operand of the second plurality of operands (e.g., Op3 of Op3 and Op4) in the second storage register circuit 101 are coupled to the first multiplier circuit 110 and a second operand of the first plurality of operands (e.g., Op2 of Op1 and Op2) in the first storage register circuit 100 and a second operand of the second plurality of operands (e.g., Op4 of Op3 and Op4) in the second storage register circuit 101 are coupled to the second multiplier circuit 111. In this example, select circuits (e.g., multiplexers) 102 and 103 may be used to selectively couple operands from input storage registers to particular multipliers based on a mode control signal. For example, in a first mode, select circuit 102 may couple OpA from register 100 to one input of multiplier 110, and select circuit 103 may couple OpB from register 101 to another input of multiplier 110. In a second mode, registers 100 and 101 may each receive and store two operands on each multiplication processing cycle. Accordingly, in the second mode, select circuit 102 couples Op1 to one input of multiplier 110 and couples Op2 to one input of multiplier 111. Similarly, in the second mode, select circuit 103 couples Op3 to another input of multiplier 110 and couples Op4 to another input of multiplier 111. Accordingly, in some modes, data may be multiplied in parallel and multipliers may be shared across multiple modes, for example.

As mentioned above, operands having the first data type (e.g., floating point values) may have a greater number of bits than operands having the second data type (e.g., integers). Accordingly, multiplier circuit 110 may be configured to multiply inputs having a greater number of bits than multiplier circuit 111, for example. In this example, operands having the second data type entering multiplier 110 may be sign extended to match the extended bit capabilities of multiplier circuit 110. For instance, the multimodal multiplier circuits may further comprise a sign extension circuit 112 coupled to outputs of the first and second storage register circuits 100 and 101 to receive, in the second mode, one of the first plurality of operands (e.g., Op1) from the first storage register circuit 100 and one of the second plurality of operands (e.g., Op3) from the second storage register circuit 101, for example. Sign extension circuit 112 may increase the number of bits of each binary number (e.g., Op1 and Op3) while preserving the number's sign (positive/negative) and value, for example. Another select circuit 104 receives the mode control signal to couple inputs of multiplier 110 to either outputs of the sign extension circuit 112 to receive operands of the second data type, or alternatively, to outputs of select circuits 102 and 103 to receive operands of the first data type.

As mentioned above, in some applications operands coupled to input registers 100 and 101 may be floating point numbers. Accordingly, a multimodal multiplier circuit may further comprise an adder circuit 113. In one mode, exponent bits of one operand (e.g., a floating point operand) in storage register circuit 100 and exponent bits in a second operand (e.g., another floating point operand) in storage register circuit 101 are coupled to adder circuit 113 (designated as dashed lines for when floating point is used). Floating point values may have the form "significand× base$^{exponent}$," where the exponent of two FP operands may be added in adder 113 and significands (aka the mantissa) of the FP operands are multiplied in multiplier 110, for example. Floating point numbers may be represented in the system using more bits than integers, for example, and thus multiplier 110 may have more bits than multiplier 111, which may only multiply operands having the second data type, for example. As described in more detail below, outputs of multipliers 110 and 111 and adder 113 may be further processed and added to other multiplier outputs.

One example application of the techniques described herein is in machine learning processors (aka artificial intelligence processors, e.g., neural networks). Such processors may require volumes of multiply-accumulate functions, and it may be desirable in many applications to flexibly process input data represent in a variety of different data types, such as signed integer, unsigned integer, or floating point (e.g., FP16 IEEE 754). Accordingly, in one embodiment, the first operands are weights and the second operands are activation values and the circuits and methods described herein are implemented in a machine learning processor. For example, one mode may configure a machine learning processor to multiply floating point (FP) numbers. Accordingly, a first FP operand corresponding to a weight may be stored in register 100 and a second FP operand corresponding to an activation (e.g., a pixel value of an input image) may be stored in register 101. In the example shown in FIG. 1A, the significand of the first and second FP operands are coupled to a wide bit format multiplier 110, for example, and the exponent bits of the FP operands are coupled to adder 113 to produce an output product (e.g., OpA*Op B×exp$^{out\_exp}$). In a second mode, the machine learning processor may multiply integer numbers. In the second mode, two 8-bit integers, for example, may be stored in each of registers 100 and 101. More specifically, two integer weights may be stored in register 100 and two integer activations may be stored in register 101. One activation and one weight may be coupled to a sign extend circuit so the integers match the wider format of multiplier 110, for example, and another activation and weight are coupled to multiplier 111 to be advantageously multiplied in parallel. Outputs of multipliers 110 and 111 (e.g., Op1*Op3 and Op2*Op4) may be further combined together, for example, and with other multiplier outputs as described in more detail below. Activations and weights may alternatively multiplied together using the techniques illustrated FIG. 1B, for example.

Figure 1B:
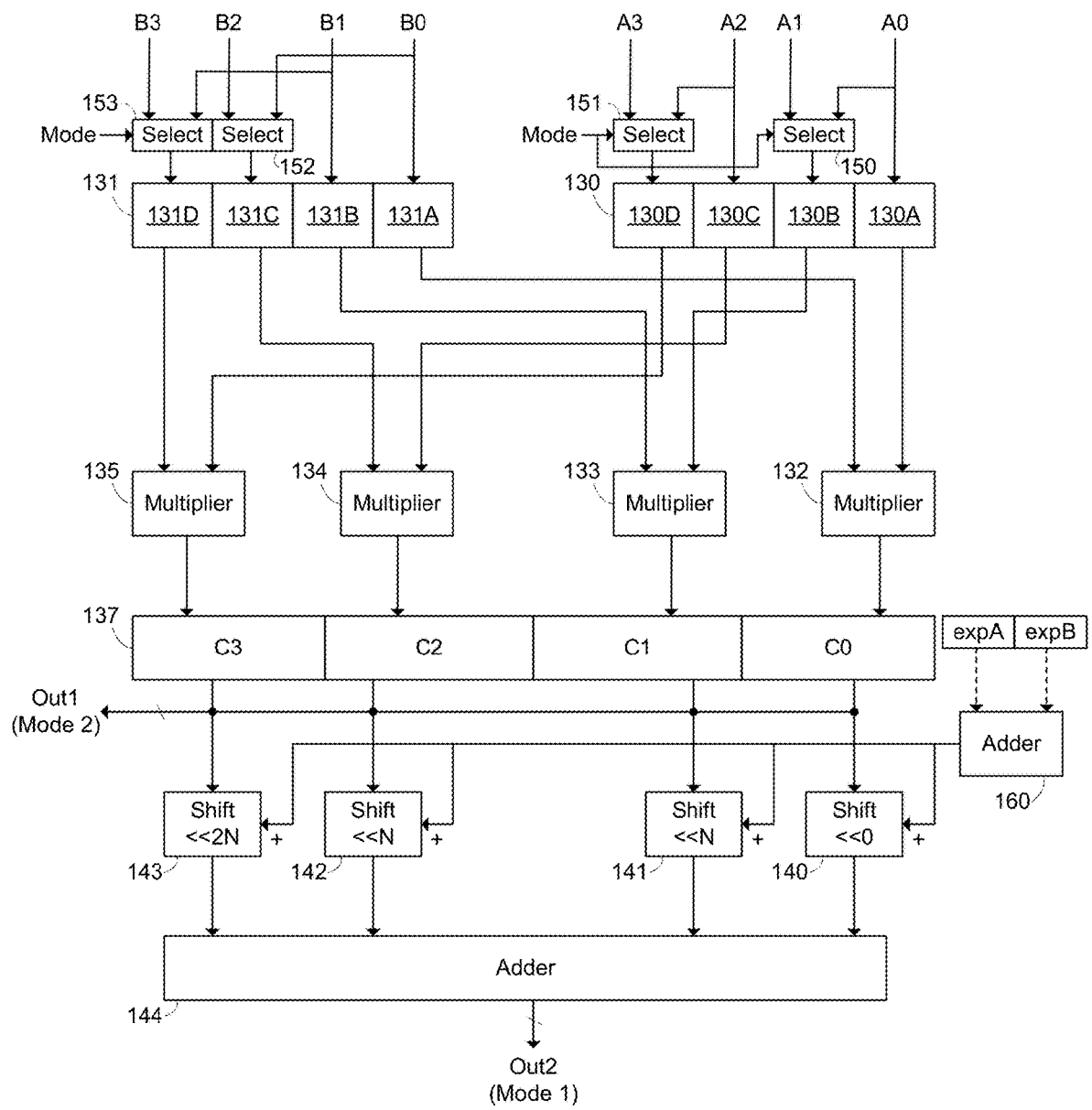
FIG. 1B illustrates a multimodal multiplier circuit according to yet another embodiment.

FIG. 1B illustrates a multimodal multiplier circuit according to yet another embodiment. In this example, one or more operands, A, may be received in a first storage register circuit 130 and one or more second operands, B, may be received in a second storage register circuit 131. A plurality of multipliers 132-135 are coupled to particular segments of registers 130 and 131 to receive the one or more operands. In this example, different operands, or components of each operand, may be positioned in different locations in registers 130 and 131 based on the mode so that multipliers 132-135 may be efficiently shared. For example, in one mode both operand A and B both correspond to four (4) operands A0-A3 and B0-B3 (e.g., a total of eight 8-bit integers). Accordingly, operands A0-A3 are stored in register segments 130A-D, respectively, and operands B0-B3 are stored in register segments 131A-D, respectively. Multiplier 132 has one input coupled to segment 130A of register 130 and a second input coupled to segment 131A of register 131 to receive operands A0 and B0. Similarly, multiplier 133 has one input coupled to segment 130B and a second input coupled to segment 131B to receive operands A1 and B1, multiplier 134 has one input coupled to segment 130C and a second input coupled to segment 131C to receive operands A2 and B2, and multiplier 135 has one input coupled to segment 130D and a second input coupled to segment 131D to receive operands A3 and B3. Accordingly, in one mode, multipliers 132-135 may multiply two sets of four 8-bit integer operands. The output product values of multipliers 132-135, C0=A0B0, C1=A1B1, C2=A2B2, and C3=A3B3, may be stored in register 137, which may provide a first output (Out1) in one of the modes, for example. C0-C3 may be concatenated and added to output products of other multimodal multiplier circuits as described below.

In another mode, the circuit may receive operands A and B having a different data type with a greater number of bits. For example, operands A and B may be a 16 bit floating point numbers. Accordingly, these operands may be stored as components in different register segments of registers 130-131. For example, one operand A may be stored as two components in two register segments in register 130, and another operand B may be stored as two components in two register segments in register 131. In one embodiment, operand A comprises a first component (e.g., lower order bits) received on A0 and stored in register segment 130A and a second component (e.g., higher order bits) received on A2 and stored in register segment 130C. Operand B comprises a first component (e.g., lower order bits) received on B0 and stored in register segment 131A and a second component (e.g., higher order bits) received on B1 and stored in register segment 131B, for example. Embodiments of the present disclosure may selectively couple different input bits into different register segments in different modes. For example, in this mode, the first component of A on input A0 may be coupled to and stored in register segment 130B, and the second component of A on input A2 may be coupled to and stored in register segment 130D. Similarly, the first component of B on input B0 may be coupled to and stored in register segment 130C, and the second component of B on input B1 may be coupled to and stored in register segment 131D. The selective arrangement of inputs in different register segments for different modes is illustrated in FIG. 1B using select circuits (e.g., multiplexers) 150-153. Accordingly, in this mode, multiplier 132 receives the first component (on A0) of operand A and the first component (on B0) of operand B, multiplier 133 receives the first component (on A0) of operand A and the second component (on B1) of operand B, multiplier 134 receives the second component (on A2) of operand A and the first component (on B0) of operand B, multiplier 135 receives the second component (on A2) of operand A and the second component (on B1) of operand B. In other words multipliers 132-135 perform the following multiplications A0B0, A0B1, A2B0, and A2B1, where A0 are the lower order (less significant) bits of A, A2 are the higher order (more significant) bits of A, B0 are the lower order (less significant) bits of B, and B1 are the higher order (more significant) bits of B.

Output product values C0-C3 of components of the inputs may be stored in register 137, for example. In this mode, outputs of multipliers 132-135 may be coupled to shift circuits 140-143. Outputs of shift circuits 140-143 are coupled to an adder circuit to produce an output product of the inputs A*B. For example, C0 may be coupled to shift circuit 140, which may have a nominal shift value of 0, C1 may be coupled to shift circuit 141, which may have a nominal shift value of N (where N is the number of bits of the input component—e.g., N=8 for an 8 bit component into each multiplier), C2 may be coupled to shift circuit 142, which may have a nominal shift value of N, and C3 may be coupled to shift circuit 143, which may have a nominal shift value of 2N. Each shift circuit may perform a left shift, for example. Accordingly, in this example, products of lower order bits A0B0 are not shifted, products of higher and lower order bits A2B0 and B1A0 are shifted by N, and products of higher order bits A2B1 are shifted by 2N. From the above it can be seen that in some embodiments no shifter 140 may be included since C0 may not be shifted. However, in one embodiment, exponent bits of floating point operands, expA and expB, may be input to adder circuit 160 and added together and the result used to increase the shift performed by each shifter circuit. For example, an output of adder circuit 160 is coupled to a control input of each shifter circuit 140-143 so that the sum of exponent bits expA and expB may increase the shift of each shift circuit (e.g., expA=1; expB=2; increase each shift by 3). The outputs of the shift circuits are summed in an adder circuit 144, which may comprise a plurality of N-bit adders, for example. The shifted and added output product values may provide a second output (Out2) in one of the modes, which may be a fixed point representation, for example. Accordingly, in some embodiments, multiplication of the inputs may result in output products being converted to a third data type, which may be added to output products of other multimodal multiplier circuits as described below.

Figure 2:
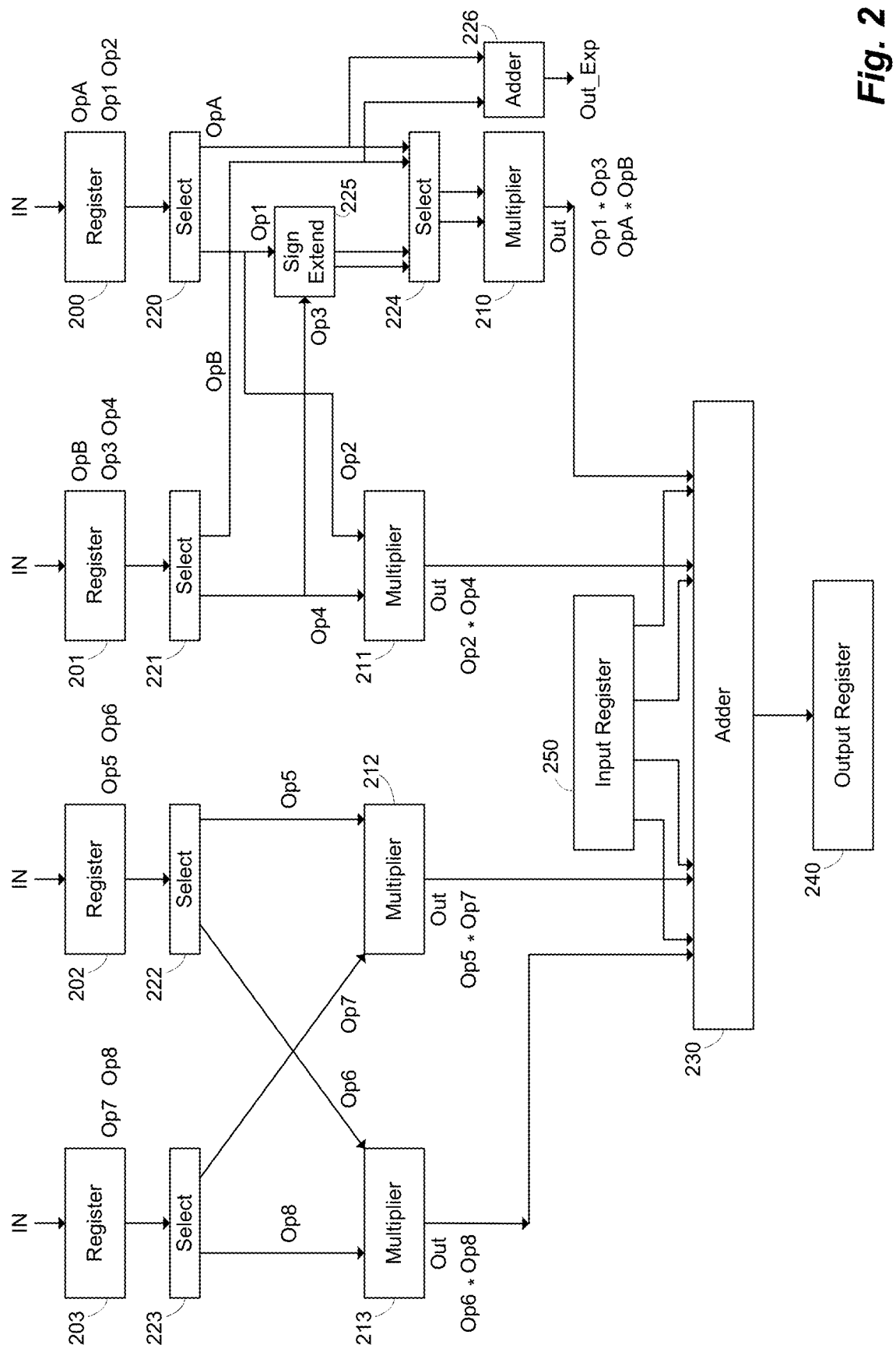
FIG. 2 illustrates an example multimodal multiplier circuit according to one embodiment.

FIG. 2 illustrates a multimodal multiplier circuit according to another embodiment. Some embodiments of the present disclosure may receive and process operands in one mode with high precision, including bit lengths long enough such that, when in another mode, multiple lower bit length operands may be processed in a plurality of parallel multipliers. In this example, registers 200-201 and multiplier 210 may process operands in a first data type (e.g., a float) in one mode, and a difference in bit representations in the system may allow processing of N (where N is an integer, e.g., N=4) operands having a second data type (e.g., integer) in another mode. Multiplier 210 may process one operand from each register 200-201 in a first mode, and multipliers 210 and 211 may combine two operands from each register 200-201 in a second mode. Additionally, the multimodal multiplier circuit shown in FIG. 2 may further comprise a third storage register circuit 202 for storing digital bits corresponding to a two additional operands (Op5, Op6) and a fourth storage register circuit 203 for storing digital bits corresponding to two more operands (Op7, Op8), where Op5-Op8 have the second data type with fewer bits than the first data type (e.g., Int8 v. FP16). In one embodiment, register 202 stores weight values and register 203 stores activation values.

The circuit in FIG. 2 may further include multipliers 212 and 213. Select circuits 222 and 223 couple operands in registers 202 and 203 to multiplier circuits 212 and 213. For example, multiplier circuit 212 may be coupled to storage register circuits 202 and 203 to receive an operand (e.g., Op5) from storage register circuit 202 and another operand (e.g., Op7) from storage register circuit 203. Similarly, multiplier circuit 213 may be coupled to storage register circuits 202 and 203 to receive an operand (e.g., Op6) from storage register circuit 202 and another operand (e.g., Op8) from storage register circuit 203. In a machine learning application, Ops5-6 are weights and Ops7-8 are activation values. Accordingly, the output of each multiplier is an activation multiplied by a weight. Advantageously, in the second mode, four multiplications may be performed in parallel. In the second mode, the outputs of each multiplier 210-213 may be coupled to an adder 230, which may sum (or accumulate) products, for example. The final output may be stored in an output register. In one embodiment, the outputs products from multipliers 210-213 are added to corresponding values in an input register 250, for example. As described further below, some embodiments may accumulate products of activations and weights (x*wt) along a column of multipliers (not shown), for example. Accordingly, in this example, input register 250 may store four (4) values of the integers (A1, A2, A3, A4), which are added to the four corresponding output products from multipliers 210-213 (R1, R2, R3, R4). The result is four (4) corresponding output values in output register 240 (A1+R1, A2+R2, A3+R3, A4+R4), which may be coupled to an input register of another group of multipliers, for example.

As described in more detail below, some embodiments of multiplier 210 may, in the first mode, produce floating point values, which are then converted to a third data type, such as fixed point, having an extended bit length to achieve wide dynamic range and accuracy. In one embodiment, a fixed point value may comprise a number of bits equal to at least N (e.g., N=4) times the number of bits produced by products of operands (e.g., Op4*Op2, Op5*Op7, Op6*Op8) having the second data type (e.g., 8-bit integer). Accordingly, the same adder 230 and output register 240 may be used to store one extended length data type or multiple integer data types, for example, which may have advantages including reduced circuit area, for example.

Figure 3:
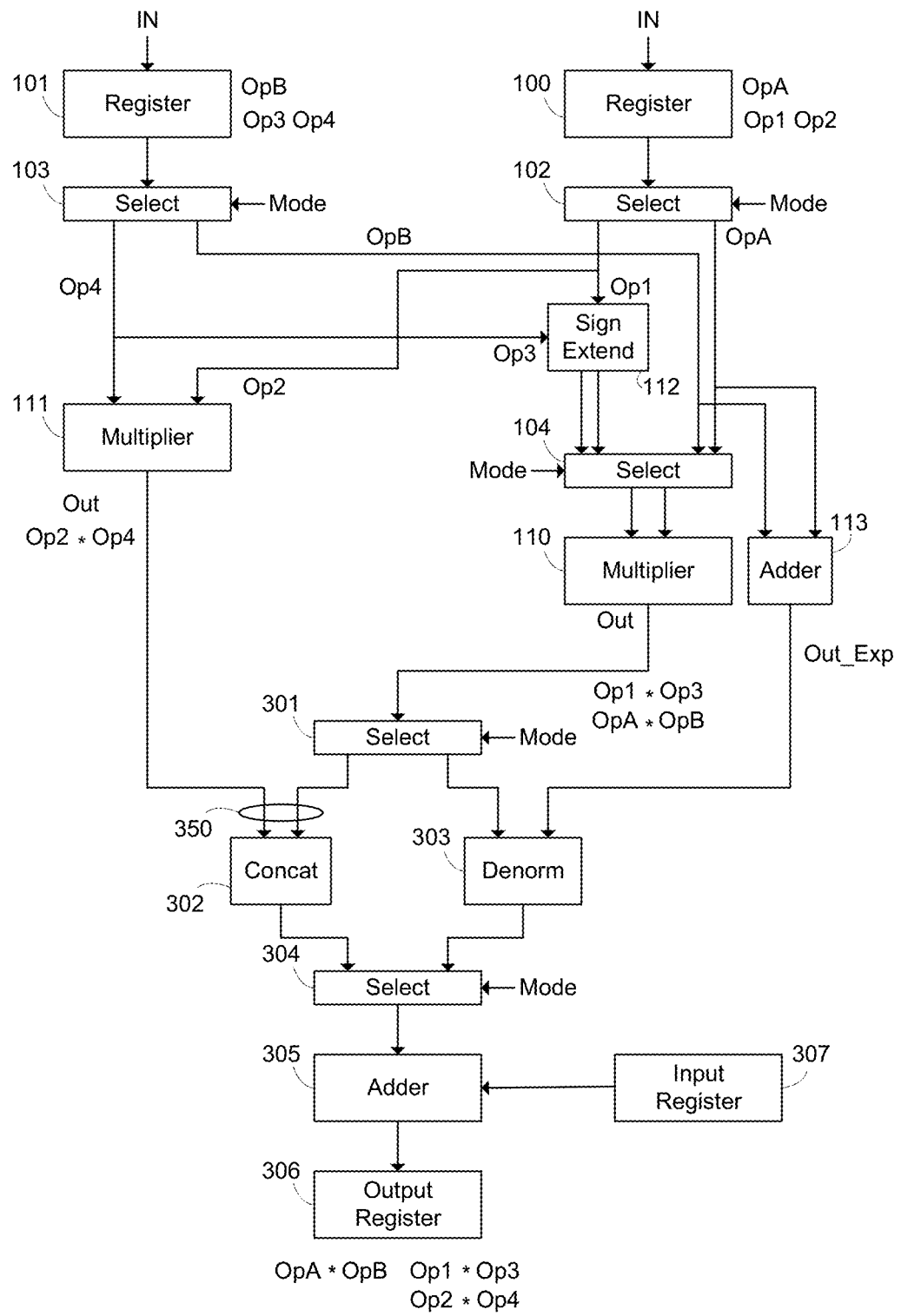
FIG. 3 illustrates another example multimodal multiplier circuit according to one embodiment.

FIG. 3 illustrates a multimodal multiplier circuit according to yet another embodiment. In this example, the output of multiplier 110 is coupled to a select circuit 301. In a first mode, the output product of multiplier 110 and summed exponents from adder 113 may be coupled to a denormalizer circuit 303. For instance, in the first mode, the denormalizer circuit 303 may receive a floating point product from multiplier circuit 110 and summed exponent bits from adder circuit 113 and produce a fixed point value. A fixed point value may be used to advantageously optimize dynamic range and precision, for example. In one embodiment, the fixed point value comprises a number of bits equal to at least N times the number of bits produced by products of operands having the second data type. Accordingly, registers and adders may be configured to process one extended length fixed point number in a first mode and N (e.g., N=4 as illustrated in FIG. 2) output product results for a second data type in a second mode. For example, in one implementation, the fixed point representation of the number, in the first mode, may have an extended bit length (e.g., 90-100 bits). In a second mode, a first output product of multiplier 110 has a first bit length greater than the other multipliers (e.g., multiplier 111 or multipliers 211-213, as mentioned above). Accordingly, one or more of the output products of the multipliers may be sign extended (e.g., at 350), in the second mode, so that the bit length of the output products are the same. The final bit length of the output products of the plurality of multipliers, in the second mode, may be substantially the same as the bit length of the fixed point number from denormalizer circuit 303 in the first mode, for example.

In this example, equalizing the number of bits between first and second modes may include concatenating the multiplier outputs, for example, using concatenation circuit 302. Accordingly, in the second mode, select circuit 301 couples the output of multiplier 110 to one input of concatenation circuit 302, and other inputs of concatenation circuit 302 may be coupled to outputs of other multiplier circuits, such as multiplier circuit 111 as shown in FIG. 3, for example. Additionally, in some embodiments, additional padding bits may be added between the concatenated values in the second mode to isolate the individual values during the addition described below, for example.

As illustrated in FIG. 2, other example embodiments may be extended to include more parallel multiplication paths for additional operands having a second data type and received during a second mode. For example, four (4) multiplications of Int8 values may be multiplied together, concatenated, added, and stored in output register 306, for example.

Referring again to FIG. 3, outputs of concatenation circuit 302 and denormalizer circuit 303, which may have substantially the same number of bits, are selectively coupled to adder 305. Adder 305 may also be configured to receive digital values from an input register 307, for example, which may be a value produced using one or more other multimodal multiplier units. In a first mode, input register 307 includes an extended length fixed point number, and in a second mode, input register 307 may include the same number of values as received by concatenation circuit 302 (e.g., 4 8-bit integers). Accordingly, adder 305 may receive and sum two or more fixed point numbers, in a first mode, or multiple arrays of values in a second format (e.g., two or more 4 integer arrays) in a second mode. The results are stored in output register 306. In the example in FIG. 3, output register 306 may store either one fixed point number or two integers, for example.

Figure 4:
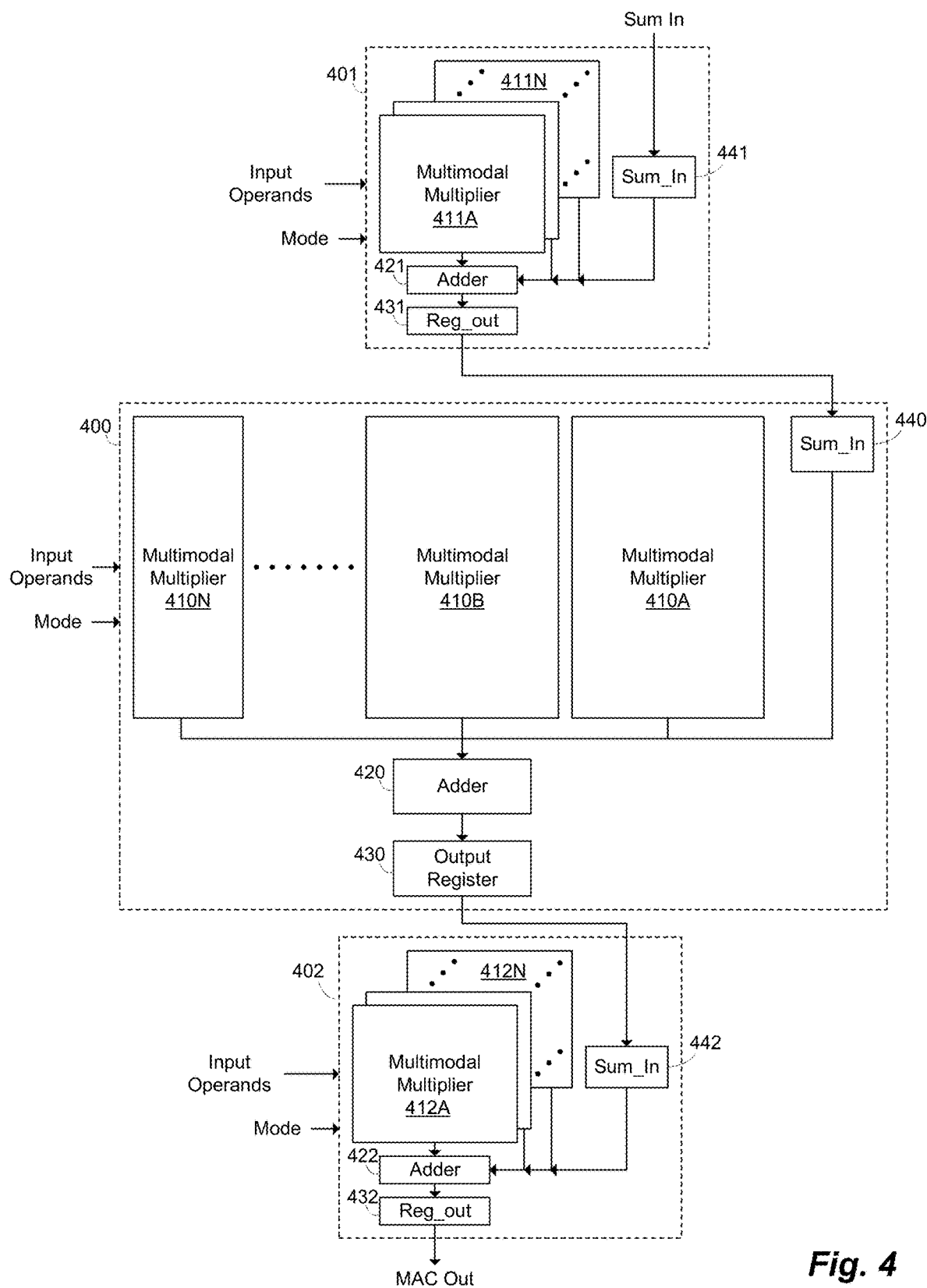
FIG. 4 illustrates a multimodal multiply-accumulator circuit according to another embodiment.

FIG. 4 illustrates a multimodal multiply-accumulator circuit according to another embodiment. In this example, a plurality of multimodal multipliers are configured in parallel, and outputs of the multipliers are coupled to inputs of an adder circuit to form a multiply-accumulator. Additionally, groups of multiply-accumulator circuits may be configured in series. For instance, multimodal multiplier circuits 410A-N may receive input operands in a first or second data type and a mode control signal ("mode") to configure the multiplier circuits to process different types of inputs. Each multimodal multiplier 410A-N may receive a pair of operands having the first data type (e.g., floating point 16) in a first mode. Alternatively, each multimodal multiplier 410A-N may receive a plurality of pairs of operands having the second data type (e.g., Int8) in a second mode. The pairs of operands may be activation values and weights of a neural network, for example, where the circuit in FIG. 4 may be included in a machine learning digital data processing circuit.

The outputs of each multimodal multiplier 410A-N may be coupled to adder 420, which may (in some embodiments) correspond to adder 230 in FIG. 2 or adder 305 in FIG. 3, for example. In the first mode, adder 420 sums values having a third data type (e.g., fixed point), where each multimodal multiplier 410A-N converts a product of the input operands from the first data type (e.g., float) to the third data type (e.g., extended length fixed point) as mentioned above. In a second mode, adder 420 sums values having the second data type (e.g., integer). In one embodiment, product values from a particular multiplier in each multimodal multiplier 410A-N are added to product values from corresponding multipliers. For example, referring to FIG. 2, the product from multiplier 210 in one multimodal multiplier 410A is added to the products from multiplier 210 in the other multimodal multipliers 410B-N, and the product from multiplier 211 in one multimodal multiplier 410A is added to the products from multiplier 211 in the other multimodal multipliers 410B-N, and so on. Accordingly, results from columns of multipliers in an array of multiplier circuits may be combined independently (e.g., as arrays of values). Outputs of adder 420 are stored in output register circuit 430, which stores a single output value in the third data type, for example, in the first mode and multiple output values having the second data type in the second mode, for example.

In some embodiments, each multiply-accumulator circuit 400-402 may comprise an input register circuit having an input coupled to an output register circuit of another multimodal multiply-accumulator circuit. For example, multiply accumulator circuit 400 includes an input register 440, which may be configured to receive one or more sums from multiply-accumulator 401 based on the mode the system is operating in, for example. Accordingly, when multiply-accumulator circuits 400 and 401 are in a first mode, input register 440 receives and stores a single input value, which may have the third data type (e.g., an extended fixed point value), and when multiply-accumulator circuits 400 and 401 are in a second mode, input register 440 receives and stores a plurality of input values having the second data type (e.g., four (4) integer values).

An output of register 440 is coupled to the adder circuit 420. Accordingly, in the first mode, a plurality of values, one from each multimodal multiplier 410A-N, may be added together and further added to the single input value in register 440. Alternatively, in the second mode, multiple values from each multimodal multiplier 410A-N and the multiple values from input register 440 are added, where values corresponding to particular columns are added to other values corresponding to particular columns. For example, if there are four values in input register 440 and four multipliers used in each multimodal multiplier 410A-N in the second mode, then a first of the four values from register 440 may be added with values from N multipliers 210 (See FIG. 2) in each of 410A-N, a second of the four values from register 440 may be added with values from multipliers 211 (in FIG. 2) in each of 410A-N, and so on, which may result in four summed output values in output register 430. An output of the output register circuit 430 is coupled to multimodal multiply-accumulator circuit 402 and a similar process may be repeated, for example.

Figure 5:
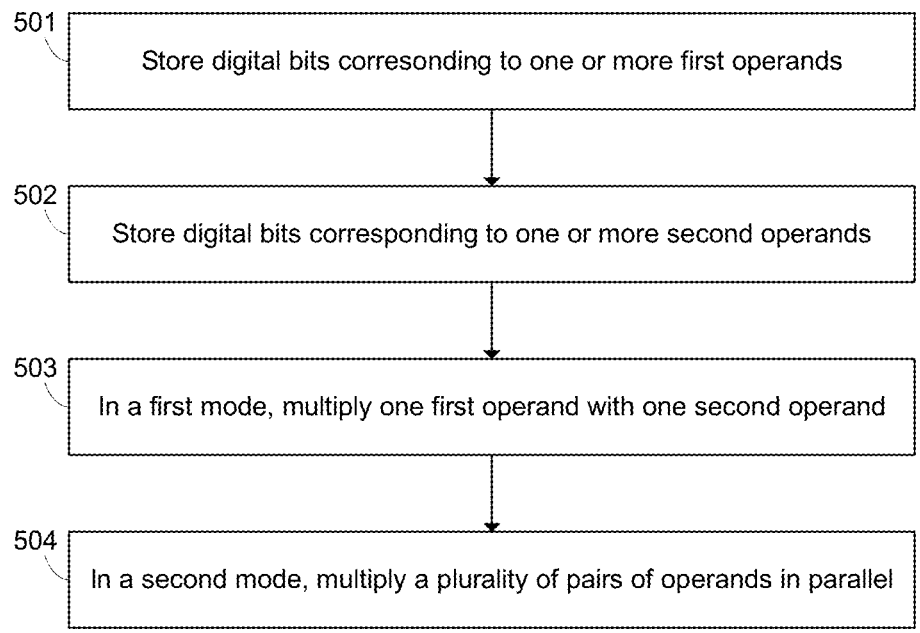
FIG. 5 illustrates a method according to an embodiment.

FIG. 5 illustrates a method according to an embodiment. At 501, digital bits corresponding to one or more first operands are stored in a first storage register circuit. At 502, digital bits corresponding to one or more second operands are stored in a second storage register circuit. In a first mode, the first and second storage register circuits may store one first operand and one second operand having a first data type. In a second mode the first and second storage register circuits may store a first plurality of operands and a second plurality of operands having a second data type. At 503, in the first mode, the one first operand in the first storage register circuit and the one second operand in the second storage register circuit are multiplied in a first multiplier circuit coupled to the first and second storage register circuits. At 504, in a second mode, one of the plurality of first operands in the first storage register circuit and one of the plurality of second operands in the second storage register circuit are multiplied using the first multiplier circuit. Additionally, another one of the plurality of first operands in the first storage register circuit and another one of the plurality of second operands in the second storage register circuit are multiplied using the second multiplier circuit.

The above specification provides illustrative and example descriptions of various embodiments. While the present disclosure illustrates various techniques and embodiments as physical circuitry (e.g., on an integrated circuit), it is to be understood that such techniques and innovations may also be embodied in a hardware description language program such as VHDL or Verilog as is understood by those skilled in the art. A hardware description language (HDL) is a specialized computer language used to describe the structure and behavior of electronic circuits, including digital logic circuits. A hardware description language results in an accurate and formal description of an electronic circuit that allows for the automated analysis and simulation of an electronic circuit. An HDL description may be synthesized into a netlist (e.g., a specification of physical electronic components and how they are connected together), which can then be placed and routed to produce the set of masks used to create an integrated circuit including the elements and functions described herein.

The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. Multiplier circuitry comprising:
   one or more storage register circuits configured to:
      store an operand having a first data type and another operand having the first data type based on a first bit value of a mode control signal, and
      store a first plurality of operands having a second data type and a second plurality of operands having the second data type based on a second bit value of the mode control signal;
   a plurality of multiplier circuits; and
   a plurality of select circuits configured to:
      couple, based on the first bit value, the operand and the other operand to at least one of the multiplier circuits for multiplication of the operand with the other operand using the at least one multiplier circuit,
      couple, based on the second bit value, a first operand of the first plurality of operands and a second operand of the second plurality of operands to a first subset of the multiplier circuits comprising the at least one multiplier circuit for multiplication of the first operand with the second operand using the first subset of multiplier circuits, and
      couple, based on the second bit value, a third operand of the first plurality of operands and a fourth operand of the second plurality of operands to a separate second subset of the multiplier circuits for multiplication of the third operand with the fourth operand using the second subset of multiplier circuits.

2. The multiplier circuitry of claim 1, wherein the operand is a weight and the other operand is an activation value.

3. The multiplier circuitry of claim 1, wherein the operand and the other operand comprise floating point values, and the first and second plurality of operands comprise integer values.

4. The multiplier circuitry of claim 1, wherein a number of the multiplier circuits used to multiply the operand with the other operand is the same as a number of the multiplier circuits used to multiply the first operand with the second operand and the third operand with the fourth operand.

5. The multiplier circuitry of claim 1, wherein the operand and the other operand comprise a greater number of bits than the first and second plurality of operands.

6. The multiplier circuitry of claim 1, wherein the plurality of multiplier circuits comprise at least a first multiplier circuit and a second multiplier circuit, the first multiplier circuit configured to multiply inputs having a greater number of bits than other inputs of the second multiplier circuit.

7. The multiplier circuitry of claim 1, further comprising a sign extension circuit configured to perform sign extension operations on the first operand and on the second operand.

8. The multiplier circuitry of claim 1, wherein the plurality of multiplier circuits are configured to multiply inputs having a same number of bits.

9. The multiplier circuitry of claim 1, wherein the plurality of multiplier circuits comprising:
   a first multiplier circuit configured to:
      receive, based on the first bit value, a first component of the operand and a first component of the other operand, and
      receive, based on the second bit value, the first operand and the second operand;
   a second multiplier circuit configured to:
      receive, based on the first bit value, the first component of the operand and a second component of the other operand, and
      receive, based on the second bit value, the third operand and the fourth operand;
   a third multiplier circuit configured to:
      receive, based on the first bit value, a second component of the operand and the first component of the other operand, and
      receive, based on the second bit value, at least one operand of the first plurality of operands and at least one operand of the second plurality of operands; and
   a fourth multiplier circuit configured to:
      receive, based on the first bit value, the second component of the operand and the second component of the other operand, and
      receive, based on the second bit value, one or more operands of the first plurality of operands and one or more operands of the second plurality of operands.

10. The multiplier circuitry of claim 9, further comprising:
   a first shift circuit coupled to the second multiplier circuit, the first shift circuit configured to shift an output of the second multiplier circuit by a first number of bits when the mode control signal has the first bit value;
   a second shift circuit coupled to the third multiplier circuit, the second shift circuit configured to shift an output of the third multiplier circuit by the first number of bits when the mode control signal has the first bit value;
   a third shift circuit coupled to the fourth multiplier circuit, the third shift circuit configured to shift an output of the fourth multiplier circuit by a second number of bits when the mode control signal has the first bit value; and
   an adder circuit coupled to outputs of the first multiplier circuit, the first shift circuit, the second shift circuit and the third shift circuit, the adder circuit configured to generate a final output of the multiplier circuitry when the mode control signal has the first bit value.

11. The multiplier circuitry of claim 1, further comprising:
   a plurality of shift circuits coupled to outputs of the plurality of multiplier circuits; and
   an adder circuit coupled to outputs of the plurality of shift circuits.

12. The multiplier circuitry of claim 1, further comprising an adder circuit, wherein exponent bits of the operand and exponent bits of the other operand are input to the adder circuit when the mode control signal has the first bit value.

13. The multiplier circuitry of claim 12, further comprising a denormalizer circuit configured, based on the first bit value, to:
   receive a floating point product from the at least one multiplier circuit and summed exponent bits from the adder circuit, and
   produce a fixed point value using the floating point product and the summed exponent bits.

14. The multiplier circuitry of claim 1, further comprising a concatenation circuit configured, based on the second bit value, to receive outputs of the plurality of multiplier circuits.

15. The multiplier circuitry of claim 1, further comprising an output register circuit configured to:
   store a single output value based on the first bit value; and
   store a plurality of output values based on the second bit value.

16. The multiplier circuitry of claim 1, further comprising an adder circuit coupled to the multiplier circuits, the adder circuit configured to sum outputs of the multiplier circuits to generate a final output of the multiplier circuitry when the mode control signal has the second bit value.

17. A method comprising:
   storing an operand having a first data type and another operand having the first data type in one or more storage register circuits based on a first bit value of a mode control signal;
   storing a first plurality of operands having a second data type and a second plurality of operands having the second data type in the one or more storage register circuits based on a second bit value of the mode control signal;
   multiplying, based on the first bit value, the operand with the other operand using at least one of a plurality of multiplier circuits;
   multiplying, based on the second bit value, a first operand of the first plurality of operands with a second operand of the second plurality of operands using a first subset of the multiplier circuits comprising the at least one multiplier circuit; and
   multiplying, based on the second bit value, a third operand of the first plurality of operands with a fourth operand of the second plurality of operands using a separate second subset of the multiplier circuits.

18. The method of claim 17, further comprising performing, based on the second bit value, sign extension operations on the first operand and on the second operand.

19. The method of claim 17, further comprising:
   shifting outputs of the plurality of multiplier circuits; and
   adding the shifted outputs.

20. A non-transitory machine-readable medium comprising a stored hardware description language program having sets of instructions, the instructions when executed produce a digital circuit comprising:
   one or more storage register circuits configured to:
      store an operand having a first data type and another operand having the first data type based on a first bit value of a mode control signal, and
      store a first plurality of operands having a second data type and a second plurality of operands having the second data type based on a second bit value of the mode control signal;
   a plurality of multiplier circuits; and
   a plurality of select circuits configured to:
      couple, based on the first bit value, the operand and the other operand to at least one of the multiplier circuits for multiplication of the operand with the other operand using the at least one multiplier circuit,
      couple, based on the second bit value, a first operand of the first plurality of operands and a second operand of the second plurality of operands to a first subset of the multiplier circuits comprising the at least one multiplier circuit for multiplication of the first operand with the second operand using the first subset of multiplier circuits, and
      couple, based on the second bit value, a third operand of the first plurality of operands and a fourth operand of the second plurality of operands to a separate second subset of the multiplier circuits for multiplication of the third operand with the fourth operand using the second subset of multiplier circuits.

* * * * *